United States Patent Office 2,703,761
Patented Mar. 8, 1955

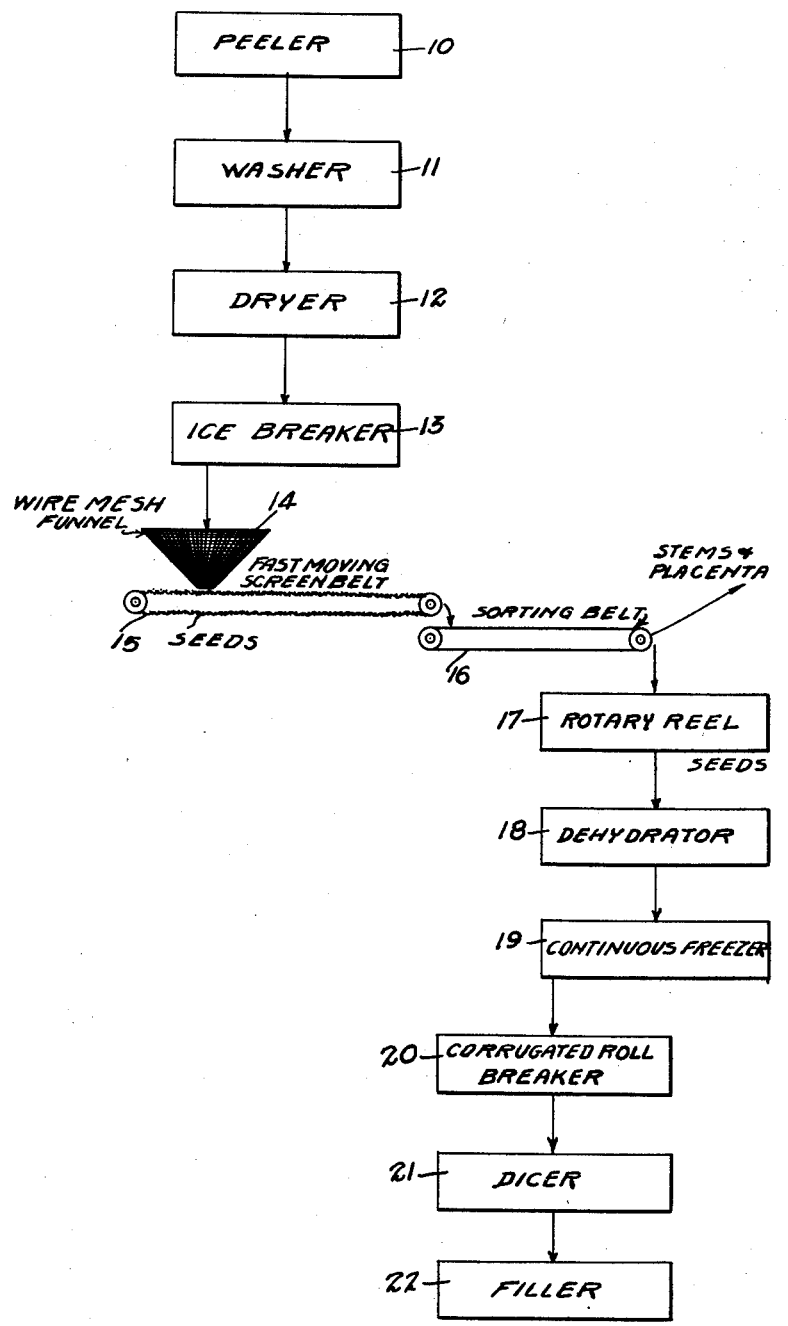

2,703,761

PROCESS FOR DEHYDRATING AND FREEZING PIMIENTOS AND PEPPERS

Eric E. Todd, Malibu, Calif., assignor to Ventura Farms Frozen Foods, Incorporated, Oxnard, Calif., a corporation of California Application February 8, 1954, Serial No. 408,856

2 Claims. (Cl. 99—204)

This invention relates to a process for dehydrating and freezing of pimientos and peppers and more particularly to a process designed to avoid the present expensive and wasteful procedures now almost universally employed.

It is accordingly one object of this invention to provide an improved process for the handling of pimientos and peppers which eliminates hand or mechanical coring.

It is a further object of this invention to provide such a process which prevents washing away of the soluble solids.

It is a further object of this invention to increase freezing capacity by the utilization of bulk freezing instead of freezing in large containers.

It is a further object of this invention to provide a process of the type described which produces a more uniformly diced product.

It is a feature of this invention that freezing takes place prior to dicing thus improving the uniformity of of the size of the diced product.

These and other objects, features and advantages will be apparent from the annexed specification in which the figure illustrates diagrammatically the various steps of the process.

In carrying out the process of this invention, the pimientos or peppers as received by the packing house are first peeled in a peeling stage indicated by the box 10. The pimientos or peppers may be peeled either by flame or steam, although steam is to be preferred. If flame is used, then rotary brushes or hand cleaning are necessary to produce a clean product. From the peeler, the pimientos or peppers are passed to a washer 11 in which they are well washed. From the washer the pimientos or peppers are passed to a dryer in the form of a reel with fans for quickly removing excess water. From a dryer 12, the pimientos or peppers are passed to an ice breaker 13 or other rotary tooth breaker so positioned that the broken product falls down the sloping sides of a wire mesh funnel 14 onto a fast moving screen belt 15. The openings in the wire mesh may be up to 1 inch. Seeds are removed both from the wire mesh 14 and the fast moving belt 15. From the belt 15, the product passes to a sorting belt 16 on which the stems and placenta are removed. From the sorting belt 16, the meats are passed to a rifled or spiraled rotary screen 17 driven at between 6 to 50 R. P. M. and preferably at 20 R. P. M. Here, all remaining seeds are rapidly removed by centrifugal force and the rapid rolling movements of the meats. Here again, the openings in the screen may be up to 1 inch.

From the rotary reel 17, the meats pass to a rotary dehydrator 18 in which they are semidried. The shell of the rotary dehydrator 18 is preferably a screen or perforated metal which again serves to eliminate any remaining seeds.

The pimiento or pepper meats dried to the correct solid contents are then passed to a continuous freezer 19 on which they are frozen in trays. From the freezer 19, the frozen meats are passed to a corrugated roll breaker 20 or other type of frozen food separator. The separated meats are then passed to a dicer 21, diced and passed to a filler 22 in which they are packaged.

While there has been described what is at present considered a preferred form of the present innvention, it will be appreciated by those skilled in the art that certain changes and modifications could be made therein without departing from the essence of the invention, the most important element of which is the removal of the seeds in the absence of water, thus avoiding the washing away of soluble solids, and while the term "pimientos" is used in the appended claims, it will be appreciated that the process also contemplates the dehydration and freezing of peppers, and therefore the word "pimientos" is to be understood to include as a full equivalent the word "peppers."

I claim:

1. The process of dehydrating and freezing of pimientos comprising the steps of: peeling, washing, and drying the pimientos; breaking said pimientos; screening said broken pimientos in the absence of water to remove seeds; sorting out stems and placentas; dehydrating said pimiento meats; freezing said dehydrated meats in bulk; breaking the frozen meats, dicing said frozen meats and packing said frozen and diced meats.

2. The process set forth in claim 1 in which said screening is performed in part under centrifugal force.

References Cited in the file of this patent

UNITED STATES PATENTS

| | | |
|---|---|---|
| 1,731,476 | Stevenson | Oct. 15, 1929 |
| 2,085,051 | Taylor | June 29, 1937 |
| 2,565,942 | Barsky et al. | Aug. 28, 1951 |